Oct. 6, 1959      I. H. SELDEN      2,907,429
HYDRAULIC TORQUE CONVERTERS

Filed March 3, 1953      3 Sheets-Sheet 1

INVENTOR.
Irving H. Selden

INVENTOR.
Irving H. Selden

United States Patent Office
2,907,429
Patented Oct. 6, 1959

2,907,429

HYDRAULIC TORQUE CONVERTERS

Irving H. Selden, Tacoma, Wash.

Application March 3, 1953, Serial No. 340,027

2 Claims. (Cl. 192—58)

This invention relates to hydraulic torque converters of the type comprising a rotor housed in a casing wherein the rotor is provided with abutments which cooperate with vanes and the converter consists of a driving shaft or flange, a driven shaft and a gear casing fixed on one of the shafts and a rotor rigid with the other shaft and enclosed in the gear casing.

Since the main embodiment of the rotary mechanism is old in the art the objects in this invention are to design the necessary elements to control a desired amount of slippage between the rotor and the enclosing frame by utilizing a pivoting vane.

Any suitable non-compressible hydraulic fluid such as is commonly used in present day hydraulic torque converters may be employed in this invention.

Other objects and advantages of the invention will appear in the following detailed description taken in connection with the accompanying drawings forming a part of this specification and in which drawings.

Figure 1:
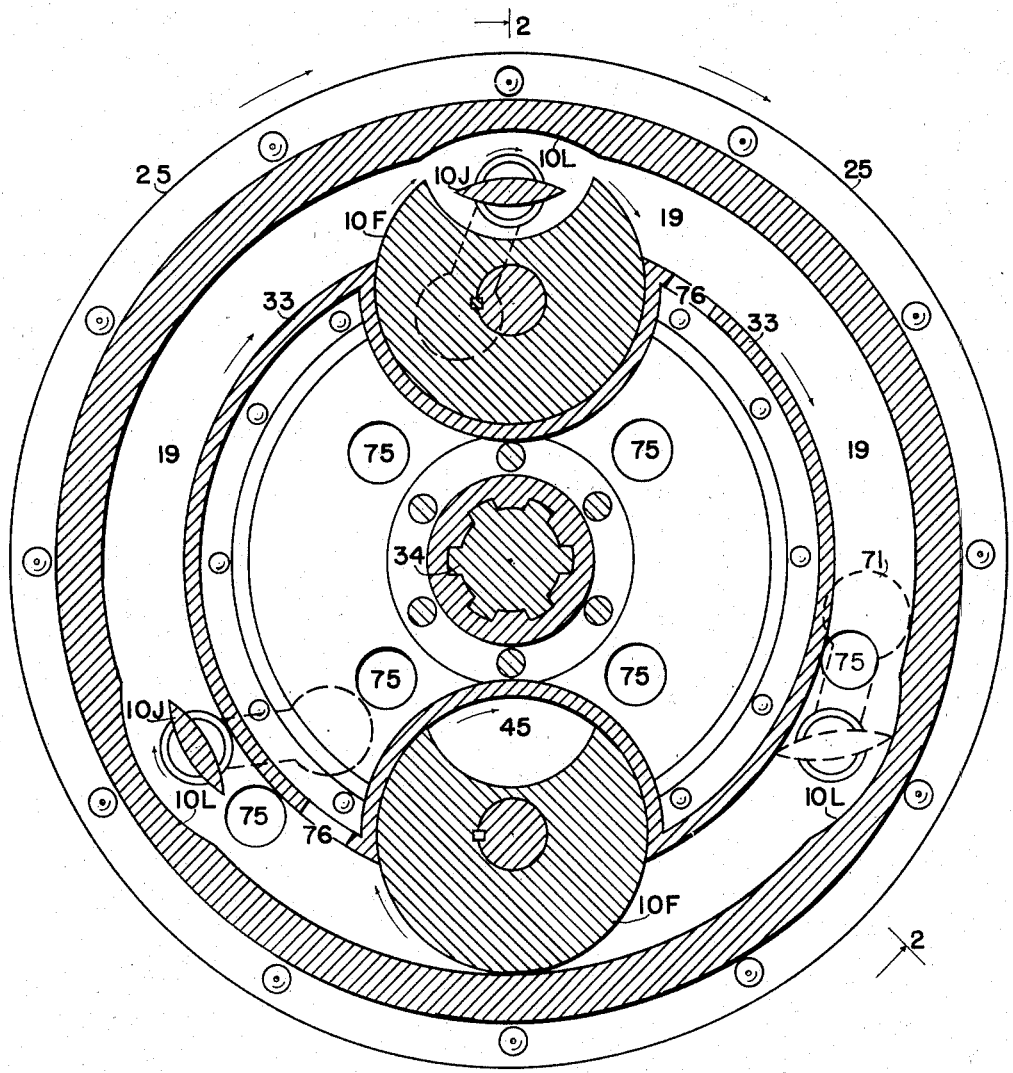
Fig. 1 is a cross-section of Fig. 2 taken on line 1—1 of Fig. 2.
Figure 2:
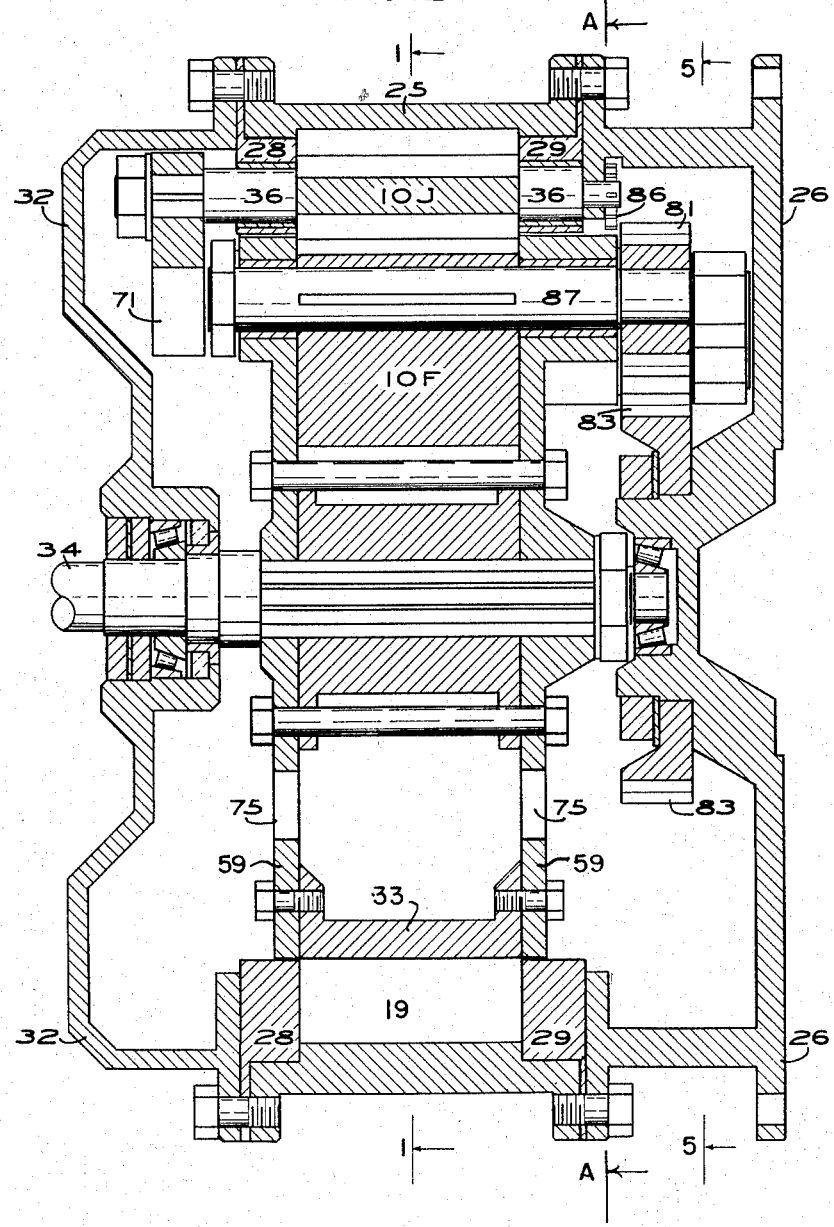
Fig. 2 is a longitudinal section of the converter taken on line 2—2 of Fig. 1. The lower half being drawn off the section line to show the make up of the rotor and arrangement of the channel.

In Figs. 1 and 2 the rotor 33 and shaft 34 represent a rotary driven unit and the enclosing gear casing 25 and flange 26 represent a driving unit providing an annular channel 19 therebetween.

The rotor forming the inner arc of the annular channel and the enclosing gear casing 25 forming the outer arc or concave surface of the annular channel, the channel end rings 28 and 29 complete the annular channel by forming the ends of the channel and thus enclose the hydraulic fluid.

The rotary driven unit consists of the shaft 34 and the rotor 33 equipped with end plates 59 to hold the abutments 10F which travel in the channel 19 formed between the rotor and the enclosing frame driving unit which consists of three main frame sections, the flange 26, the middle section 25, and the end section 32. These bolt together and hold channel end rings 28 and 29 which in turn hold the bearings for the pivoting vanes 10J. Coil springs 86, keyed on their inner ends to the vane shafts 36 and anchored to the gear casing on their outer ends by pin 87 (see also Fig. 4), tend to hold the vanes in an unoperated or neutral position. Weighted levers 71 are fastened to the shafts of the vanes and so arranged as to tend to turn the vanes on their axis against the action of the coil springs 86 when the driving enclosing frame is turned at sufficient speed. The abutments are arranged to turn 3 times each time the rotor turns once in relation to the enclosing frame or housing. Main drive gear 83 fastened to the flange 26 turns intermediate or reversing gear 82 which in turn drives gears 81 fastened one to each of said abutments. Gear 83 is three times the size of gear 81. In turning three times per revolution and being properly timed the vanes 10J are allowed to pass the abutments by means of the passing slots 45 in the said abutments since they are set so their passing slots are 180 degrees out of phase with respect to each other.

The operation of the transmission is as follows: With a suitable driving force applied at flange 26 the driving enclosing frame will rotate freely around the driven rotor as long as the vane members 10J remain held in a neutral position by coil springs 86. (See vane at lower left of Fig. 1.) The abutments only have one passing slot each and are set 180 degrees out of phase with each other so that there will only be one abutment passing slot exposed to the channel at any one time in such a way as to allow the fluid in the channel to pass it. Consequently the fluid in the channel will always be locked relatively stationary in relation to the rotor. It follows then that as the vanes turn on their axis due to the centrifugal force of the weighted levers, they will act as valves in closing off the channel so that when they are eventually closed as shown at lower right of Fig. 1 there will be a fluid block between the vanes and the abutments and the transmission will be locked in a 1 to 1 ratio. The various ratios in between will depend on the amount of turn of the vanes.

In Fig. 1 the arcuate cut-outs designated as 10L are large enough to allow for the displacement of the fluid by the vanes and their purpose is to keep the drag of the transmission to a minimum when it is operating in neutral by thus preventing the restriction of the volume of the channel at the location of the vanes. These arcuate cut-outs are cut out of the large arc of the main channel and extend the full width of the channel. Thus with a streamlined vane and an ample volume for the fluid to pass the vanes there should be very little drag when operating in neutral.

The ports 75 and 76 on the low pressure sides of the vanes and abutments allow the fluid easy access into the channel from inside the rotor and the enclosing casing.

Figure 4:
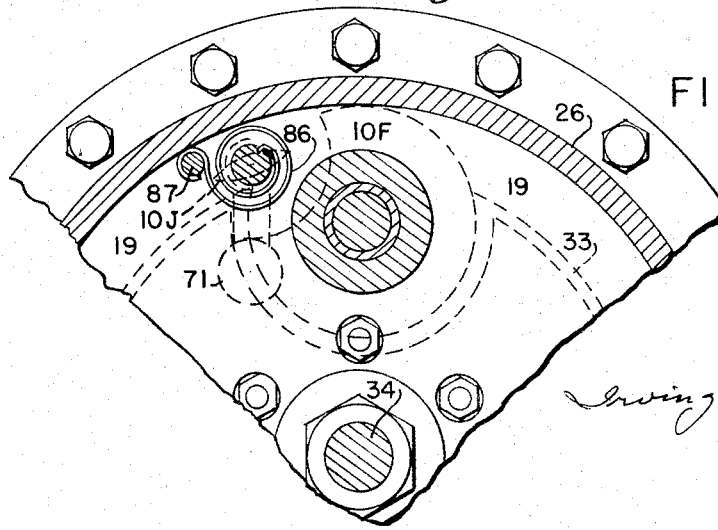
Fig. 4 is a quarter cross-section taken on line AA of Fig. 2 and shows the arrangement of the mounting of coil spring 86 which tends to hold the vane in a neutral position.

Fig. 4 is a quarter of a cross-section similar to that of Fig. 2 but taken on line A—A of Fig. 2 to show the arrangement of the spiral spring 86 which tends to restore the vane to a neutral position at all times. The spring is anchored to pin 87 at one end and engages in a groove or key-way in the vane shaft on the other end with the required amount of tension to properly balance the torque of the weighted lever to thus assist in ratio control. This action is as follows. The vanes turn on shafts that are mounted in rings that turn in unison with the enclosing frame. At low or idling speeds the springs 86 are strong enough to overcome the torque exerted on the vane shafts by the weighted levers 71. As the speed is increased the torque of the weighted levers is increased due to centrifugal force. This increased torque overcomes the spring tension and turns the vanes on their axis to thus restrict the passage of the fluid past the vanes in the channel. Actually the vanes at this point would be traveling in the main channel through the fluid in the channel held stationary in relation to the channel by the abutments. As the restriction of the clearance increases by the pivoting of the vanes the pressure is increased against said stationary fluid in the channel. Consequently the torque is increased against the driven shaft which holds the driven rotor within which the abutments are mounted that hold the fluid stationary in the channel in relation to said rotor.

Figure 3:
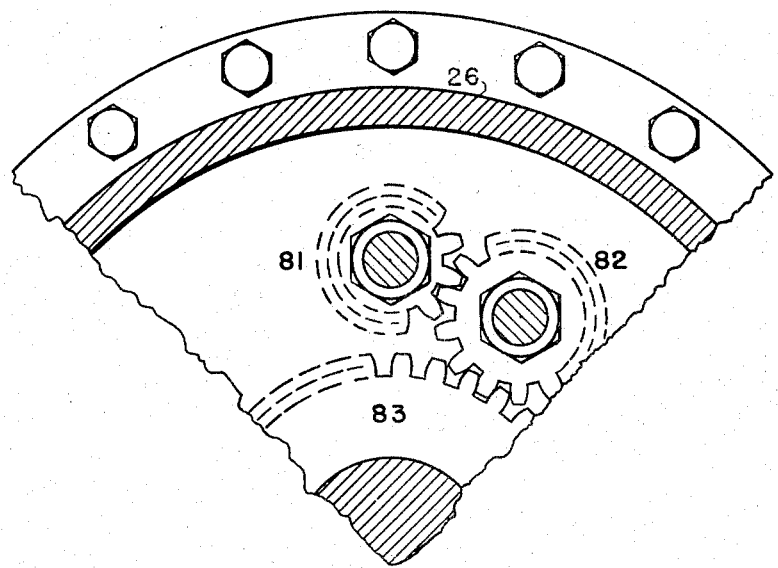
Fig. 3 is a 90 degree section taken on line 5—5 of Fig. 2 and discloses the arrangement of the abutment driving gears.

When the driving enclosing frame reaches sufficient speed the weighted levers turn the vanes which thus act as valves to a closed or fully operated position, thereby forming a fluid block between the driving enclosing frame and the driven shaft, at which time the converter would be operating in a 1 to 1 ratio. In such a process in the case of the balanced vane of Fig. 1 the weighted levers would only have to overcome the tension of the coil return springs in order to turn to a closed position. However in the case of the offset vane as disclosed in Fig. 3 another factor is made available to assist in the ratio control. By being offset so as to have more working surface behind the axis than ahead of its axis it will take more power to turn it to a closed position. As the load on the driven shaft increases the pressure on the vane will increase and the harder it will be to turn to a closed position. This force which supplements the tension of the coil spring thus would tend to balance the load on the transmission by extending the time of the ratio changes. In order to overcome the force added to that of the coil springs the driving member would have to turn faster to increase the centrifugal force of the weighted levers in order to turn the vanes to a closed position. Thus we might say that the offset vane automatically "feels" the amount of torque being placed on the driven shaft and automatically compensates for the load by in turn controlling the amount of speed the driving member will require to ultimately turn the vanes to a closed position.

Although there appears to be no stator or stationary member in this mechanism which would incline one to regard it as a fluid clutch only, there are other elements that should be appraised. The mechanism can better be understood if considered as the combination of a hydraulic pump and a hydraulic motor wherein the surface of the pistons in the pump can be varied while the displacement of the motor is constant. Considered in this light the mechanism would appear to also act as a reduction gear.

It is of course understood that many variations may be made in the details of construction of this improved converter without departing from the spirit of the invention as outlined in the appended claims.

Having therefore described my invention what I claim and desire to secure by Letters Patent is:

1. A hydraulic torque converter, comprising in combination, a driving flange, a driven shaft, a gear casing fixed on said flange, a rotor rigid with the shaft and enclosed in said gear casing to form an annular channel therebetween, the inner surface of the gear casing forming the outer concave surface of the annular channel and the outer cylindrical surface of the rotor forming the inner convex surface of the annular channel, the rotor being of smaller radius than that of the gear casing to thus provide a working channel therebetween, said gear casing having end members closing the ends of said channel, and adapted to be filled with a suitable hydraulic fluid, cooperating power transmitting elements arranged in said gear casing and on said rotor comprising respectively a plurality of pivoting vane members and rotary abutment members, said abutment members being cylindrical in shape and the same length as the rotor, said rotor having segmental openings of the same radius as the abutment members and receiving said abutment members, the axis of the abutment members being parallel to that of the rotor, said abutment members extending outward and adapted to roll against the inner surface of the gear casing, each abutment member being equipped with a radial passing slot the full length of said abutments and deep enough to allow passage of the pivoting vane members, means for rotating said abutment members to turn them in the same direction as the rotor and gear casing and timed to allow passage of the vanes and divide the annular channel into a plurality of working spaces, said abutment members being set with their passing slots 180 degrees out of phase with respect to each other and are thus arranged so that the convex surface of either one of the abutments is always rolling against the outer concave surface of the annular channel to thus block and hold the fluid in the channel stationary in relation to the rotor and the driven member, said pivoting vane members being of ovate cross-section and similar to a butterfly valve and extending the full length of the channel and are wide enough to close the channel and are pivoted on the casing, means including coil springs for holding the vanes in a normally open position, said pivoting vane members being arranged to open or close said channel, centrifugal means to turn said pivoting vane members to a closed position when said gear casing reaches sufficient speed of rotation to overcome the tension of said coil springs, said vane members being so arranged that when the transmission is operating in neutral their cross-section is generally parallel to the surface of the rotor but when said vanes are fully operated they are turned on their axis toward a radial position in relation to the rotor to close the channel, said pivoting vane members thus acting as valves to regulate the rate of flow of fluid in the channel in relation to the gear casing to thus control the ratio of the transmission by thus regulating the amount of slippage between the driving and the driven members or to entirely close the channel to lock the transmission in a 1 to 1 ratio, said pivoting vane members lying completely within the annular working channel and comprising the entire fluid blocks associated with the driving member to close the channel which in effect by thus closing the channel lock the converter in a 1 to 1 ratio by completing a fluid block between the driving and the driven transmission elements.

2. In a hydraulic torque converter as set forth in claim 1, arcuate cut-outs cut out of the convex surface of the enclosing frame where it forms the outer arc of the main channel adjacent to each vane and of sufficient depth to compensate for the volume of the fluid displaced by each of said vanes to thus reduce drag in the transmission when operating in neutral.

References Cited in the file of this patent

UNITED STATES PATENTS

| | | |
|---|---|---|
| 693,271 | Harding | Feb. 11, 1902 |
| 879,045 | Henderson | Feb. 11, 1908 |
| 1,032,283 | Henderson | July 9, 1912 |
| 1,461,556 | Reece | July 10, 1923 |
| 1,645,565 | Wingquist | Oct. 18, 1927 |
| 1,682,085 | McKinney | Aug. 28, 1928 |
| 2,175,970 | Perkins | Oct. 10, 1939 |
| 2,200,157 | Christlein | May 7, 1940 |
| 2,244,207 | Lorton | June 3, 1941 |
| 2,292,987 | Berry | Aug. 11, 1942 |
| 2,379,592 | Philbrick | July 3, 1945 |
| 2,386,912 | Sawtelle | Oct. 16, 1945 |
| 2,406,548 | Landrum | Aug. 27, 1946 |